Feb. 21, 1967  G. U. OPPEL  3,304,721
AIRCRAFT THRUST VECTOR CONTROL ASSEMBLY
Filed Sept. 8, 1964  6 Sheets-Sheet 1

INVENTOR.
GEORGE U. OPPEL
BY *Rupert J. Brady*
ATTORNEY

Feb. 21, 1967  G. U. OPPEL  3,304,721
AIRCRAFT THRUST VECTOR CONTROL ASSEMBLY
Filed Sept. 8, 1964  6 Sheets-Sheet 2

INVENTOR.
GEORGE U. OPPEL
BY
*Rupert J. Brady*
ATTORNEY

Feb. 21, 1967  G. U. OPPEL  3,304,721
AIRCRAFT THRUST VECTOR CONTROL ASSEMBLY
Filed Sept. 8, 1964
6 Sheets-Sheet 4
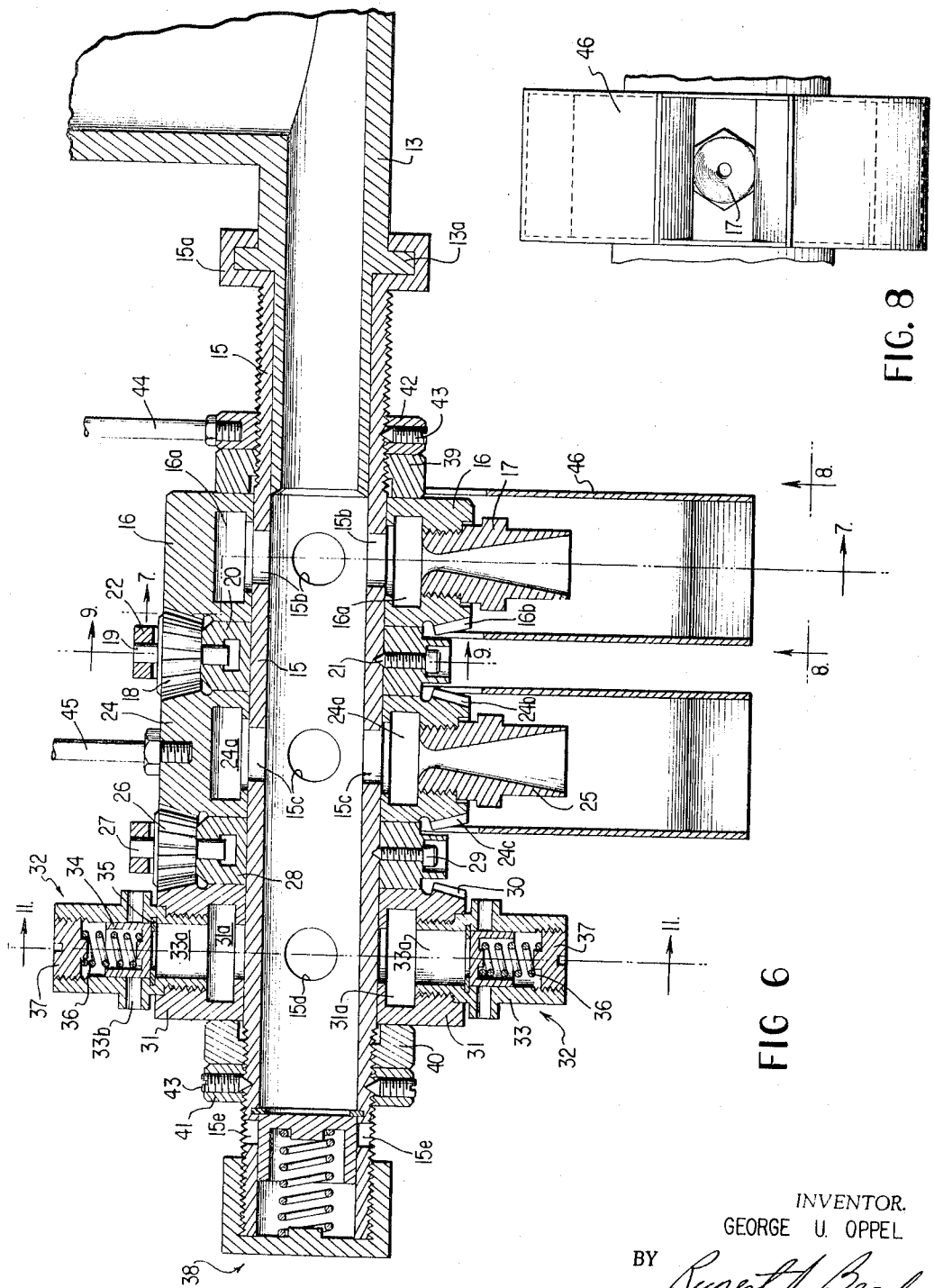
INVENTOR.
GEORGE U. OPPEL
BY
*Rupert J. Brady*
ATTORNEY

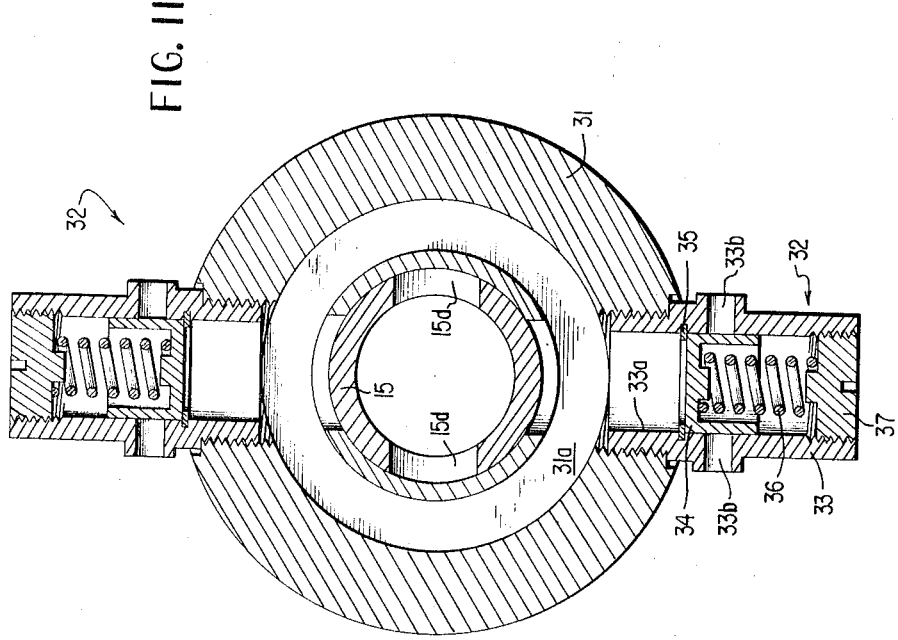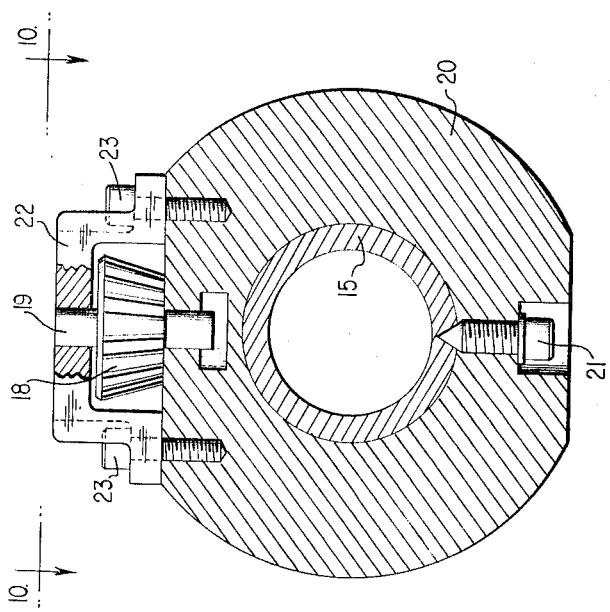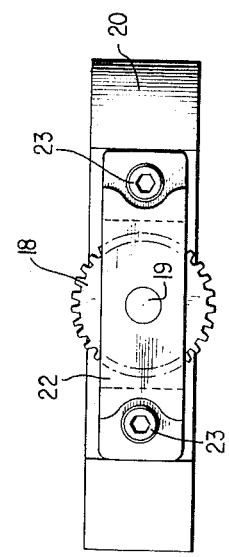

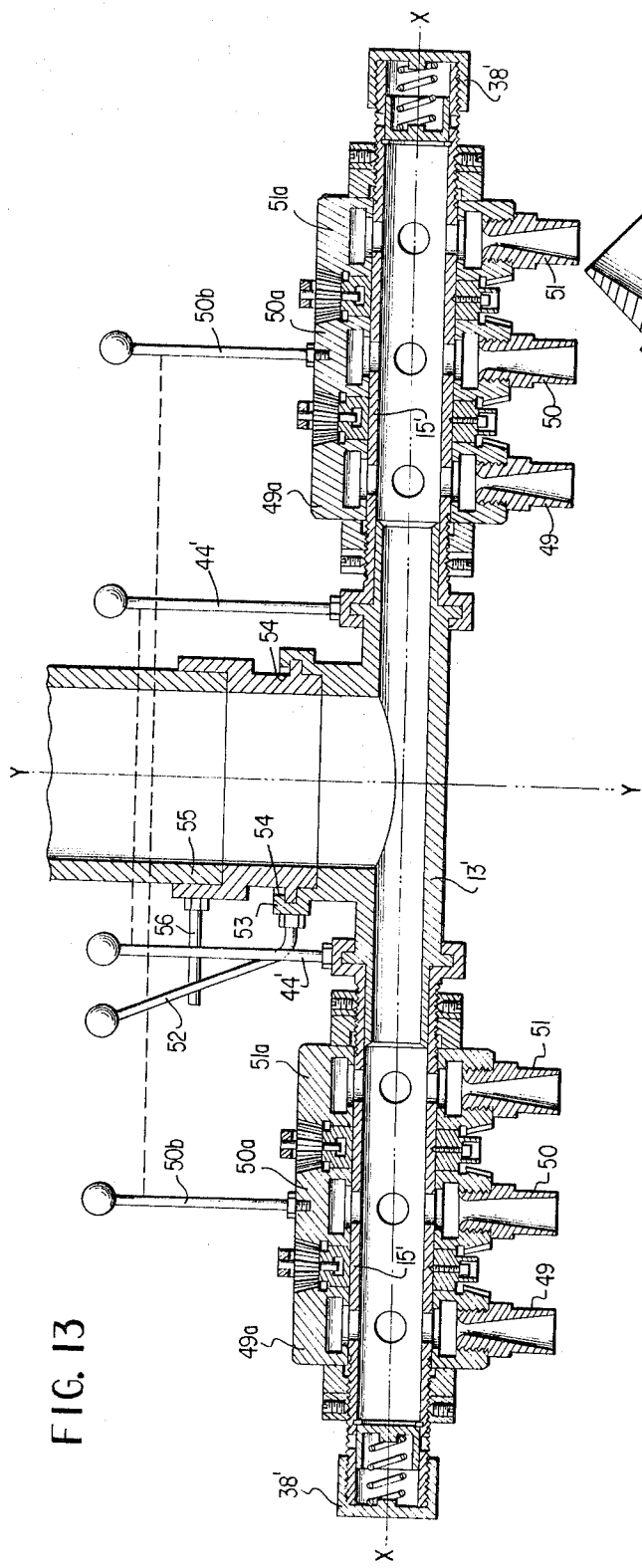
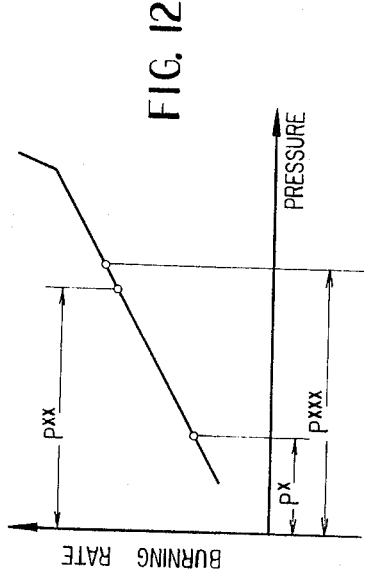
FIG. 13
FIG. 14
FIG. 12
INVENTOR.
GEORGE U. OPPEL

United States Patent Office
3,304,721
Patented Feb. 21, 1967

3,304,721
AIRCRAFT THRUST VECTOR CONTROL ASSEMBLY
George U. Oppel, Buchen, Odenwald, Germany
(17 Putzstrasse, 5321 Niederbachem, Germany)
Filed Sept. 8, 1964, Ser. No. 394,678
14 Claims. (Cl. 60—232)

This invention relates to an aircraft utilizing jet propulsion including a plurality of reaction nozzles; and more particularly, to a control assembly for varying the direction of pointing of the nozzles to thereby control the propulsion thrust vector whereby the speed and direction of the aircraft may be controlled.

In propulsion systems utilizing solid fuel propellants the combustion gases issuing from the burning propellant are caused to flow through a plurality of reaction nozzles which develop sufficient thrust to propel the aircraft. Great difficulty has been experienced in the control of aircraft employing the solid propellant propulsion system due to the fact that once the propellant is ignited it cannot be stopped. Various arrangements have been proposed to control the rate of burning of the propellant; one such arrangement utilizing a quenching system. While these proposed arrangements are satisfactory for their intended purposes they are subject to certain objections due to their complicated design and expensiveness in manufacture.

After considerable research and experimentation the thrust vector control assembly of the present invention has been devised to overcome the disadvantages experienced in hitherto employed solid fuel propulsion systems. Since the burning rate of the solid fuel propellant can not be properly controlled, the assembly of the present invention utilizes the thrust developed by the combustion gases of the fuel flowing through the reaction nozzle to vary the speed and, in some instances, the direction of the aircraft. This is accomplished by providing the aircraft with at least two reaction nozzles rotatably mounted thereon in such a manner that when one nozzle is rotated in one direction the other nozzle is rotated an equal but opposite direction. By this construction and arrangement when the nozzles are pointing in the same direction and are parallel to each other, their relative angle being 0°, the resultant thrust is equal to the summation of the thrusts developed by each nozzle, and when the nozzles are rotated 180° with respect to each other so that the nozzles are pointing in opposite directions the resultant thrust will be zero. Accordingly, when the nozzles are rotated so that their relative angle is between 0° and 180°, the resultant thrust will assume a value between zero and the value produced when the nozzles are parallel to each other; that is, 0° relative.

The control assembly of the present invention is not only constructed and arranged to move the reaction nozzles relative to each other to vary the magnitude of the thrust, as explained above, but it is also adapted to rotate the nozzles as a unit about the longitudinal and/or transverse axes of the aircraft to thereby change the direction of the resultant thrust with the concomitant change in direction of the aircraft.

An object of the invention is to provide an improved control assembly for varying the magnitude and direction of the thrust vector of an aircraft having a jet propulsion system.

Another object of the invention is to provide an improved control assembly for varying the magnitude of the thrust vector of an aircraft utilizing jet propulsion wherein a plurality of reaction nozzles are rotatably mounted on the aircraft and are adapted to be rotated between 0° and 180° relative to each other.

Yet another object of the invention is to provide an improved control assembly for varying the direction of the thrust vector of an aircraft utilizing jet propulsion, wherein a plurality of reaction nozzles are rotatably mounted on the aircraft and are adapted to be rotated as a unit relative to the longitudinal and/or transverse axis of the aircraft to thereby vary the direction of flight of the aircraft.

Still another object of the invention is to provide an improved control assembly for varying the magnitude and direction of the thrust vector of an aircraft having a jet propulsion system employing a solid fuel propellant, wherein a fuel saving device is provided for reducing the burning rate of the fuel.

Yet still another object of the invention is to provide an improved control assembly for varying the magnitude and direction of the thrust vector of an aircraft having a jet propulsion system wherein a plurality of solid fuel propellant containers are provided and are constructed and arranged for selective ignition.

A further object of the invention is to provide an improved thrust vector control assembly adapted for use in the jet propulsion system of either vertical or short take-off and landing aircraft.

These objects are carried out by the below described embodiment of the invention, consisting in the construction, arrangement and combination of the various parts of the device set forth fully and specifically pointed out in the claims of the specification hereinafter following and illustrated in the accompanying drawings in which:

FIGURE 6 is a sectional view of one embodiment of the thrust vector control assembly of the present invention;

FIGURE 8 is a view taken along line 8—8 of FIGURE 6;

FIGURE 9 is a view taken along line 9—9 of FIGURE 6;

FIGURE 10 is a view taken along line 10—10 of FIGURE 9;

FIGURE 11 is a view taken along line 11—11 of FIGURE 6;

FIGURE 12 is a graph illustrating the relationship of pressure to the burning rate of the solid fuel propellant;

FIGURE 13 is a sectional view of another embodiment of the thrust vector control assembly of the present invention; and FIGURE 14 is a modification of the reaction nozzle employed in the thrust vector control assembly of the present invention.

Figure 1:
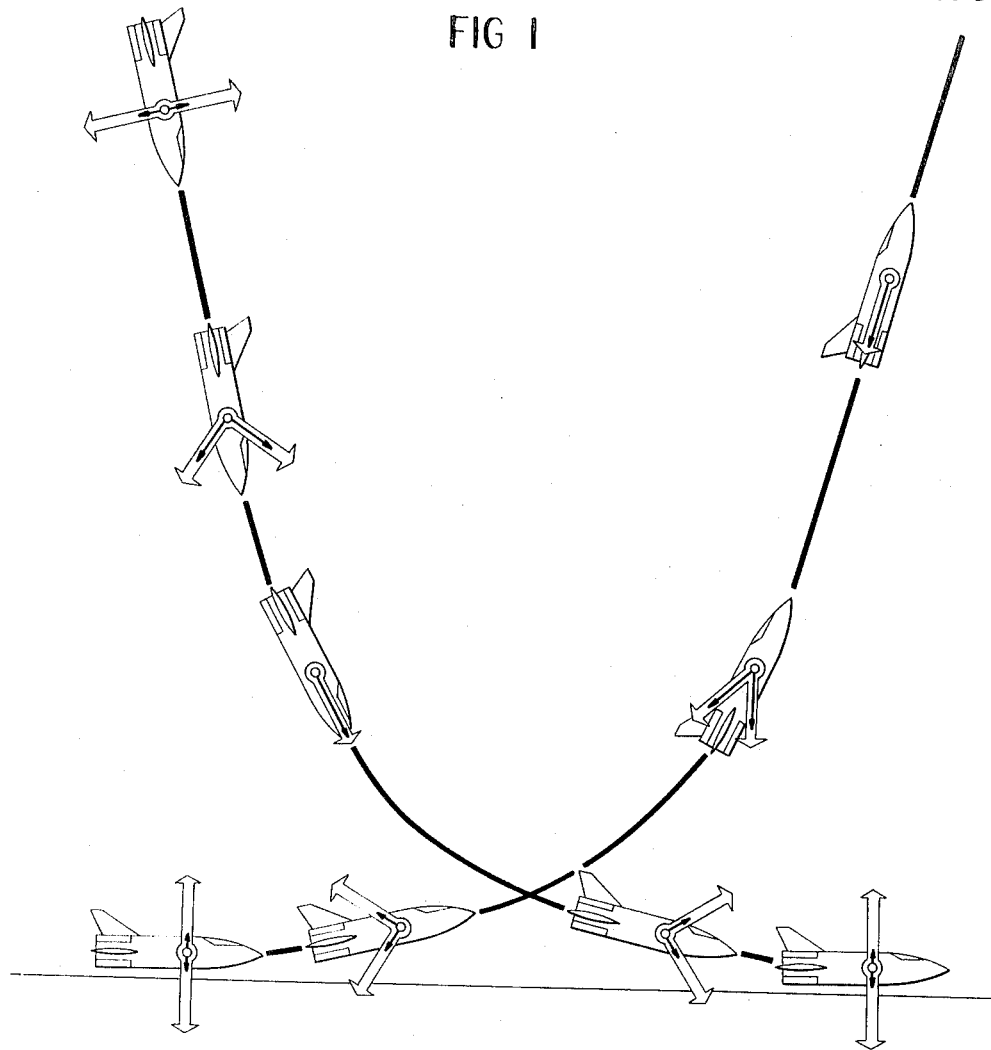
FIGURE 1 is a diagrammatic view of an aircraft having a jet propulsion system and showing the various resultant thrust vectors developed by moving the reaction nozzles relative to each other during take-off and landing of the aircraft.

Referring to the drawings and more particularly to FIGURE 1, the principle of varying the thrust magnitude by moving the reaction nozzles relative to each other is diagrammatically illustrated therein. Before take-off, the reaction nozzles are positioned 180° with respect to each other so that the resultant thrust, indicated by the oppositely extending arrows, will be equal to zero. As the aircraft takes-off the nozzles are gradually rotated relative to each other until their relative angle is 0° wherein the nozzles are parallel and are pointing in the same direction toward the rear of the plane, the resultant thrust being equal to the vector-summation of the thrust developed by each nozzle.

When landing, the reaction nozzles are positioned 180° with respect to each other and are normal to the longitudinal axis of the aircraft, with the resultant thrust being zero. The nozzles are then generally gradually rotated relative to each other until their relative angle is 0° so that the nozzles are pointing in the same direction toward the front of the plane. This is the maximum thrust developed by the nozzles for braking the aircraft as it approaches the ground. As the aircraft lands the nozzles are once again rotated 180° relative to each other so that the resultant thrust will be equal to zero.

Figure 4:
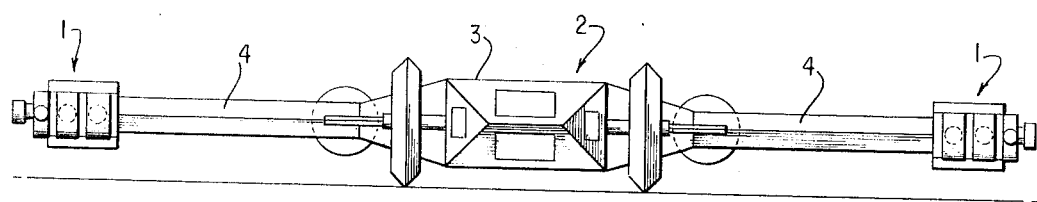
FIGURE 4 is a front elevational view of the aircraft shown in FIGURE 3.
Figure 2:
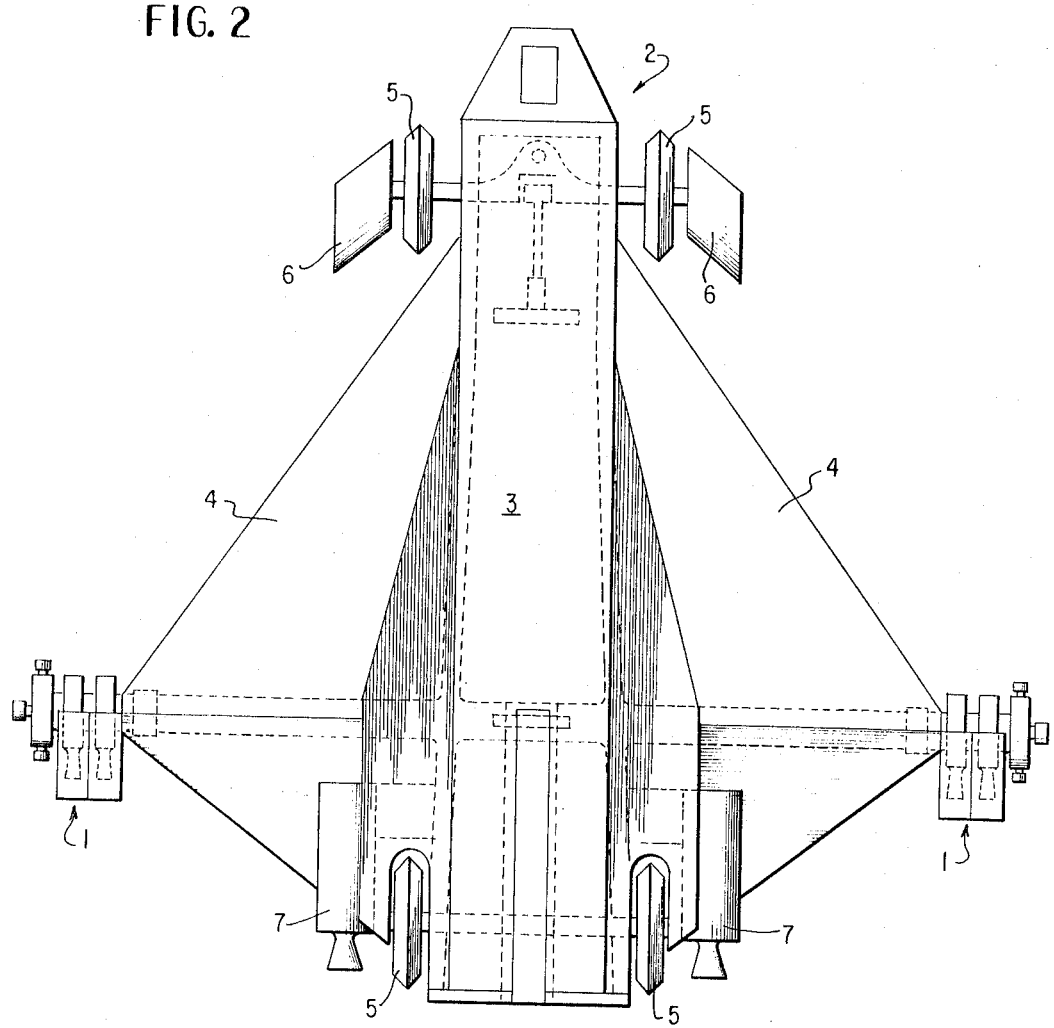
FIGURE 2 is a top plan view of the thrust vector control assembly of the present invention, shown mounted on an aircraft which is adapted to be used either as a vertical or as a short take-off and landing craft.
Figure 3:
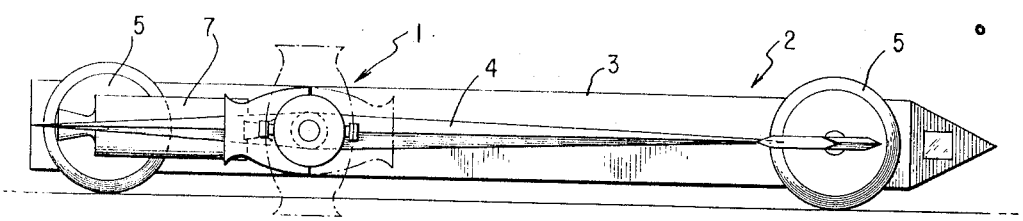
FIGURE 3 is a side elevational view of the aircraft shown in FIGURE 2.

By way of example, the thrust vector control assembly designated generally by the reference numeral 1 is shown, in FIGURES 2, 3 and 4, mounted on an aircraft 2 which can be either of the vertical or short take-off and landing type, the aircraft including a fuselage 3, wing sections 4, wheels 5, altitude control members 6 and ramjets 7 for high speed cruising.

Figure 5:
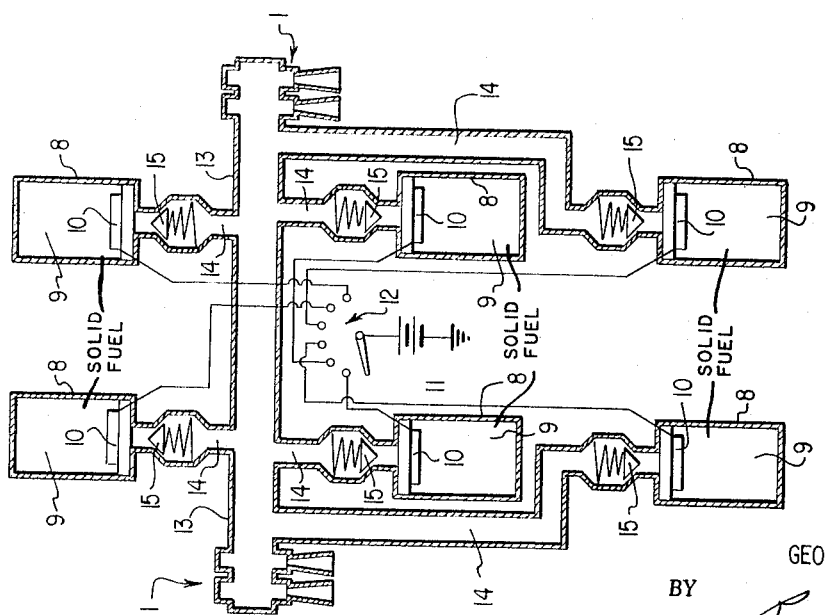
FIGURE 5 is a diagrammatic view of the solid fuel propellant containers employed in the aircraft utilizing the thrust vector control system of the present invention.

A diagrammatic view of the solid fuel propellant system adapted to be employed in the aircraft illustrated in FIGURES 2 to 4 is shown in FIGURE 5, wherein there is provided a plurality of receptacles 8 each containing a volume of solid fuel 9 and an electrical igniter 10, each igniter being connected to a source of current 11 through a selector switch 12. Each of the fuel containers are connected to a manifold 13 by means of a plurality of branch lines 14 having spring biased check valves 15 mounted therein, the ends of the manifold communicating with the thrust vector control assemblies 1 disposed on the extreme ends of the aircraft wings 4. By the construction and arrangement of the solid fuel propellant system, the fuel in each container can be selectively and sequentially ignited by means of the selector switch 12, with the resultant combustion gases flowing through branch lines 14 to the manifold 13 and into the thrust vector control assemblies 1, to be described more fully hereinafter.

As will be seen in FIGURE 6, each thrust vector control assembly 1 comprises a main tube 15 rotatably mounted on the outer end of the manifold 13 and retained thereon by means of a collar 15a journalled on a shoulder 13a formed on the manifold. A ring member 16 having an annular chamber 16a is rotatably mounted on main tube 15, the ring member carrying a reaction nozzle 17 which is adapted to be placed in communication with manifold 13 by means of annular chamber 16a and apertures 15b formed in main tube 15. An end face of the ring member 16 is provided with a toothed surface 16b (FIGURE 7) to thereby form a ring gear which is adapted to mesh with a bevel gear 18 secured to a pintle 19. One end of the pintle is journalled within a ring member 20 secured to main tube 15 by means of a set screw 21 and the opposite end of the pintle is journalled within a yoke member 22 (FIGURE 9) which is secured to ring member 20 by means of bolts 23.

Another ring member 24, similar to ring member 16, is rotatably mounted on main tube 15 and carries another reaction nozzle 25 which is placed in communication with the manifold by means of apertures 15c formed in the main tube and annular chamber 24a formed in ring member 24. Each end face of ring member 24 is provided with a toothed surface 24b and 24c to thereby form a ring gear adapted to mesh, respectively, with bevel gear 18 and another bevel gear 26 carried by a pintle 27 rotatably mounted in a ring member 28 secured to main tube 15 by means of a set screw 29.

Bevel gear 26 is also adapted to mesh with a ring gear surface 30 formed on the end face of a third ring member 31 having an annular chamber 31a which is adapted to be placed in communication with manifold 13 by means of two ports 15d (FIGURE 11) formed in main tube 15. Ring member 31 is adapted to carry a pair of diametrically opposed relief valves, designated generally by reference number 32, each relief valve comprising a housing 33 threadedly secured to the ring member and having an axial bore 33a communicating with annular chamber 31a. Radial ports 33b are also formed in the housing to establish communication between axial bore 33a and the atmosphere, said communication being controlled by a piston 34 slidably mounted within the axial bore and biased against a seat 35, by means of a spring 36 positioned between the piston and a plug 37, said plug being threaded into the end of the housing whereby the biasing force of the spring may be varied.

The end of main tube 15 is also provided with a safety relief valve 38, similar in construction to relief valves 32, whereby communication is established between manifold 13 and atmosphere through ports 15e, formed in the tube when pressure within the tube reaches a predetermined value.

Ring members 16, 20, 24, 28 and 31 are maintained in assembled relationship on main tube 15 by means of thrust collars 39 and 40 carried by the main tube and abutting ring members 16 and 31, respectively; the thrust collars being held in position by means of locking rings 41 and 42 secured to main tube by set screws 43. Locking ring 42 is provided with a control rod 44 whereby the entire assembly including main tube 15 can be rotated about the longitudinal axis of manifold 13 and a similar control rod 45 is secured to ring member 24, whereby reaction nozzles 17 and 25, and relief valves 32 can be rotated relative to each other and to the main tube, to be described more fully hereinafter.

Figure 7:
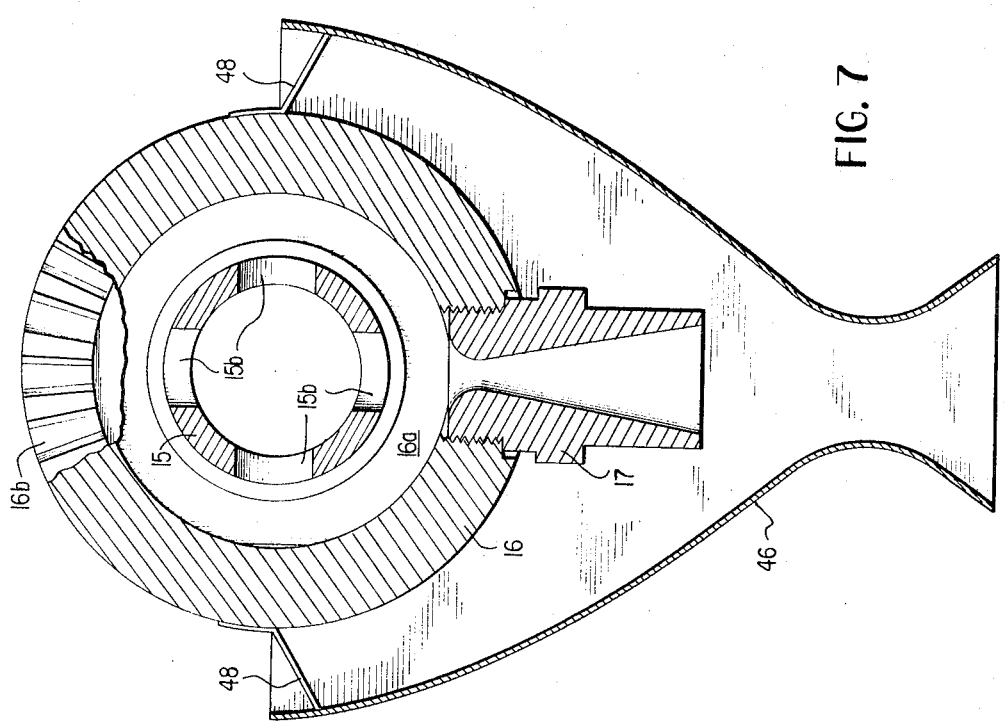
FIGURE 7 is a fragmentary sectional view taken along line 7—7 of FIGURE 6.

To complete the structure of the thrust vector control assembly, each of the reaction nozzles are provided with ducts 46 and 47, secured to the respective ring members 16 and 24, by means of a spider member 48 (FIGURE 7).

In the operation of the thrust vector control assembly illustrated in FIGURE 6, the gases of combustion issuing from the solid fuel containers (FIGURE 5) flow to each end of the manifold and into the main tube 15 of each thrust vector control assembly, the thrust developed by the flow of gases through reaction nozzles 17 and 25 propelling the aircraft. To vary the magnitude of the thrust, as described hereinabove with respect to FIGURE 1, control rod 45 is actuated. The construction and arrangement of gears 18 and 26 is such that when nozzle 25 is rotated in one direction about main tube 15, nozzle 17 is caused to rotate an equal but opposite direction. When it is desired to change the direction of the resultant thrust developed by nozzles 17 and 25, control rod 44 is actuated to thereby rotate the main tube and nozzle assembly, as a unit, about the longitudinal axis of the manifold which corresponds to the transverse axis of the aircraft as viewed in FIGURE 2.

One of the important features of the present invention is the provision of the relief valves 32 on rotatable ring member 31. The construction and arrangement of ring member 31 and gear 26 is such that when nozzles 17 and 25 are in the non-working position; that is, when they are disposed 180° relative to each other, the resultant thrust being zero, the ports 15d in the main tube will be in communication with annular chamber 31a, thus allowing the combustion gases to be vented to the atmosphere through ports 33b. During other relative positions of the nozzles; that is, when the resultant thrust does not equal zero, there will be little or no communication between annular chamber 31a and main tube 15 as illustrated in FIGURE 6. Thus, relief valves 32 function as fuel saving devices when nozzles 17 and 25 are disposed in a non-working position. The principle of this fuel saving feature is illustrated diagrammatically in FIGURE 12, wherein the burning rate of the solid fuel propellant is plotted on the ordinate and the pressure within the main tube and manifold is plotted on the abscissa. Thus, it will be seen that the burning rate of the fuel is almost directly proportional to the pressure, $p^{xxx}$ representing the maximum safe operating pressure of the assembly wherein relief valve 38 will vent the main tube to atmosphere, $p^{xx}$ representing the working pressure of the assembly, and $p^x$ representing the pressure when the nozzles are at a non-working position with the annular chamber 31a being in communication with the main tube through ports 15d. $p^x$ represents the lowest possible pressure for supporting combustion of the fuel; thus, while the nozzles are in a non-working position, the relief valves 32 reduce the pressure in the main tube to $p^x$ and decrease fuel consumption to an amount of approximately 1/10 of that consumed during the working positions of the nozzles. The fuel consumption during the various positions of the nozzles is represented by the dark arrows in FIGURE 1.

A modification of the thrust vector control assembly disclosed in FIGURES 6 to 11 is illustrated in FIGURE 13 wherein each control assembly includes three nozzles 49, 50 and 51 rotatably mounted on the main tube 15' by means of ring members 49a, 50a and 51a, respectively. The thrust developed by nozzle 50 will be equal to the sum of the thrusts developed by nozzles 49 and 51 since as indicated in FIG. 13 the throat of nozzle 50 is substantially larger than the throats of nozzles 49 and 51 but equal in area to the throats of these two nozzles combined; therefore, as nozzle 50 is rotated in one direction by means of actuator 50b, nozzles 49 and 51 are caused to rotate, as a unit, in an equal but opposite direction. It will be understood to those skilled in the art that the actuators 50b on the thrust vector control assemblies at each end of the manifold 13' are operatively connected together as shown by the broken lines so that movement of the nozzles at one end of the manifold will cause a corresponding movement of the nozzles on the opposite end of the manifold which corresponds to opposite sides of an aircraft upon which the assembly is mounted.

Like the embodiment disclosed in FIGURES 6 to 11, a control rod 44' is provided for rotating the entire vector control assembly as a unit, about the X—X axis, to thereby change the direction of the thrust vectors. Further control of the direction of the thrust vector is afforded by rotation of the manifold 13' and associated nozzle assemblies about the Y—Y axis which would correspond to the longitudinal axis of the aircraft. This is accomplished by means of an actuator 52 secured to a collar 53 carried by manifold 13' and journalled as at 54 to a conduit 55 communicating with the fuel containers and aligned with the longitudinal axis of the craft. If desired, a stop member 56 can be connected to the conduit 55 for limiting the rotation of the assembly about the X—X and/or Y—Y axes.

While the relief valves 32 are not shown in the embodiment illustrated in FIGURE 13, it is within the purview of the present invention to so provide the assembly with the fuel saving devices as well as the safety valves 38'.

Where design of the aircraft requires it, a modification of the nozzle arrangement is illustrated in FIGURE 14 wherein the nozzle 57 is carried by a ring member 58 which is rotatably mounted on the main tube 15, the nozzle being carried by the ring member in such a manner that it is disposed at an angle of up to approximately 45° to the transverse axis of the main tube.

The material from which the thrust vector control assembly of the present invention is constructed consists of high temperature metals, such as, chromium, vanadium, molybdenum, niobium, rhenium and cobalt. These metals may also be laminated to steel or aluminum by a shrinking or welding process employed for joining together different types of metals.

While the invention has been shown and described in a preferred embodiment it is realized that modifications can be made and it is to be understood that no limitations on the invention are intended other than those imposed by the scope of the appended claims. It is to be understood that the control rods and actuators 44, 45, 44', 50b and 52 are shown for purposes of illustration in describing the control of the nozzle assemblies, and can readily be replaced by other type control actuating gearing depending upon the structural requirements of the aircraft, rocket, or the like, on which the assembly is utilized.

I claim:

1. A thrust vector control assembly of the character described for varying the magnitude and direction of the thrust vector of an aircraft of either the vertical or short take-off and landing type having a propulsion system with at least one outlet for thrust production, including at least two reaction nozzles adapted to be rotatably mounted on the aircraft gas outlet in relatively close adjacent relation, and control means operatively connected to said reaction nozzles to simultaneously rotate the nozzles in equal but opposite directions relative to each other in one direction, from a position of zero thrust wherein the nozzles are directed in opposite direction, to a position of substantial alignment in the same direction to produce a maximum thrust in a first direction, and said control means operatively connected to simultaneously rotate the nozzles in equal but opposite directions relative to each other in the opposite direction from the zero thrust position to a position of substantial alignment with each other in the opposite direction to produce a maximum thrust in a second direction opposite to the thrust in the first direction, to thereby vary the magnitude and direction of the thrust vector of the aircraft.

2. A thrust vector control assembly according to claim 1, including second control means operatively connected to the reaction nozzles for rotating the two nozzles as a unit in the same position relative to each other to thereby vary the direction of the resultant thrust vector of the aircraft.

3. A thrust vector control assembly according to claim 1, wherein the aircraft propulsion system includes a plurality of solid fuel propellant containers a common manifold means communicating with the reaction nozzles, individual communicating means connected between each of said containers and said manifold means, and switch means electrically connected to said containers for sequentially and selectively igniting the solid fuel in each container.

4. A thrust vector control assembly of the character described for use in combination with a gas generating fuel system means, comprising, a main tube connected to receive the gases of combustion from the fuel system means, a pair of reaction nozzles rotatably mounted on said main tube, a plurality of ports formed in the main tube registering with the nozzle inlets, and control means operatively connected to the nozzles for simultaneously rotating the nozzles between 0° and 180° relative to each other, whereby the maximum resultant thrust developed by the nozzles is attained when the nozzles are 0° relative to each other, and the resultant thrust is zero when the nozzles are 180° relative to each other.

5. A thrust vector control assembly according to claim 4, wherein control means are operatively connected to the nozzles for moving the nozzles as a unit to thereby vary the direction of the resultant thrust.

6. A thrust vector control assembly according to claim 4, wherein relief valve means are rotatably mounted on the main tube and adapted to be placed in communication with the interior thereof, said relief valve means being operatively connected to said control means, whereby when the nozzles are positioned 180° relative to each other, the relief valve means are placed in communication with the interior of said tube.

7. A thrust vector control assembly according to claim 4, wherein safety valve means are mounted on the main tube.

8. A thrust vector control assembly according to claim 4, wherein the nozzles are disposed at an angle to the transverse axis of the tube.

9. A thrust vector control assembly of the character described for a gas generating means comprising, a main tube connected to receive the gases of combustion from the gas generating means, three reaction nozzles rotatably mounted on said tube, a plurality of ports formed in the tube registering with the nozzle inlets, the sum of the thrusts developed by two of said nozzles being equal to the thrust developed by the third nozzle, and control means operatively connected to said nozzles for rotating said two nozzles, as a unit, relative to said third nozzle, whereby said two nozzles are rotated between 0° and 180° relative to said third nozzle to thereby vary the magnitude of the resultant thrust developed by the nozzles.

10. A thrust vector control assembly according to claim 8, wherein control means are connected to the nozzles for rotating the nozzles as a unit to thereby vary the direction of the resultant thrust developed by the nozzles.

11. A thrust vector control assembly for an aircraft having a solid fuel propellant system including a plurality of solid fuel containers communicating with a manifold, said manifold extending transversely of the aircraft, a thrust vector control assembly mounted on each end of said manifold, said control assembly comprising a main tube rotatably mounted on the end of said manifold and being in communication therewith, at least two ring members rotatably mounted on said tube, a nozzle carried by each ring member, the inlets of said nozzles being in communication with the interior of said tube, and gear means operatively connected to said ring members, whereby when one nozzle is rotated in one direction the other nozzle is caused to rotate in an equal but opposite direction.

12. A thrust vector control assembly according to claim 11, wherein a third ring member is rotatably mounted on the main tube, gear means operatively connected between said third ring member and one of the other ring members, and check valve means carried by said third ring member, whereby when said nozzles are rotated to a position 180° relative to each other, the check valve means are placed in communication with the interior of the main tube.

13. A thrust vector control assembly according to claim 12, wherein safety valve means are mounted on the end of said main tube.

14. A thrust vector control assembly according to claim 11, wherein duct means are carried by each ring member for enclosing the respective nozzle.

References Cited by the Examiner

UNITED STATES PATENTS

| | | | |
|---|---|---|---|
| 2,956,401 | 10/1960 | Kane | 60—39.47 X |
| 3,057,581 | 10/1962 | Tumavicus | 244—52 |
| 3,066,486 | 12/1962 | Kirshner et al. | 60—39.47 X |
| 3,098,625 | 7/1963 | Thielman | 60—39.47 X |
| 3,114,520 | 12/1963 | Finvold | 244—52 X |
| 3,150,847 | 9/1964 | Moore et al. | 244—4.1 |
| 3,199,809 | 8/1965 | Modesti | 244—12 |

CARLTON R. CROYLE, *Primary Examiner.*